United States Patent [19]

Toyoshima et al.

[11] Patent Number: 4,769,728
[45] Date of Patent: Sep. 6, 1988

[54] MAGNETIC HEAD HAVING CERAMIC COUPLING BODY

[75] Inventors: Humitoshi Toyoshima, Nagaoka; Shoichi Koyama, Horinouchi, both of Japan

[73] Assignee: Alps Electric Co, Ltd., Japan

[21] Appl. No.: 5,827

[22] Filed: Jan. 21, 1987

[30] Foreign Application Priority Data

Mar. 24, 1986 [JP] Japan .................. 61-65126

[51] Int. Cl.[4] .................. G11B 5/12; G11B 5/25; G11B 5/251
[52] U.S. Cl. .................. 360/118; 360/121; 360/122
[58] Field of Search .................. 360/121, 119-120, 360/122, 118

[56] References Cited

U.S. PATENT DOCUMENTS 4,514,776 4/1985 Koyama et al. .................. 360/121

Primary Examiner—John H. Wolff
Attorney, Agent, or Firm—Guy W. Shoup; Leighton K. Chong; Paul J. Winters

[57] ABSTRACT

A magnetic head comprising a pair of erasing cores, a coupling body coupling the pair of erasing cores together, the coupling body having a groove, and a recording and reproducing core fitted into the groove in the coupling body so as to form an erasing gap on each side of the recording and reproducing core. At least the periphery of the groove is formed by a nonmagnetic material having a glass erosion resistance.

3 Claims, 5 Drawing Sheets

MAGNETIC HEAD HAVING CERAMIC COUPLING BODY

BACKGROUND OF THE INVENTION

1. Field of the Invention

The present invention relates to a magnetic head for a digital recording and reproducing device such as a flexible disc as an external memory used in a computer.

2. Art Background

FIG. 5 is a perspective view of the assembly of a recording and reproducing core and a pair of erasng cores in a conventional straddle erase type magnetic head for a flexible disc. In FIG. 5, the recording and reproducing core 1 defines a recording and reproducing gap 1a at a predetermined position relative to a side edge 1c of one leg 1b of the core 1. The core 1 is fitted into a narrowed portion 6b of a groove 6 provided in a coupling body of high-melting point glass 3 integral with the erasing cores 2. Cores 2 and coupling body 3 constitutes an erasing core chip 7. The core 1 is secured firmly by a low-melting point glass binder to the core chip 7 so that an erasing gap 2a is provided on each side of the recording and reproducing gap 1a.

The erasing core chip 7 is fabricated as follows. In FIG. 6(a), a recess of a desired shape 5 is cut in a lower surface (as seen in FIG. 6(a)) of a rectangular parallel-epiped block of ferrite, sendust or the like 4 which is the material of the erasing core. The recess 5 is then filled with melted high-melting glass material 3. As shown in a perspective view of FIG. 6(b), groove 6 including wide portion 6a and narrower portion 6b is cut in the middle top of block 4 so as to extend into the glass body 3. Both sides of block 4 are then cut into a predetermined shape.

Finally, as shown in a perspective view of FIG. 6(c), block 4 is sliced so as to obtain erasing core chip 7 which includes erasing cores 2 integral with high-melting point glass body 3.

As described above, however, when the erasing core chip 7 including the two erasing cores 2 joined with high-melting point glass body 3 is fitted into and secured firmly to the recording and reproducing core 1, using low-melting point glass as a binder, the narrower groove portion 6b formed in glass body 3 of core chip 7 is eroded and softened by the low-melting point glass, so that the recording and reproducing core 1 is inclined at the narrower groove portion 6b to be deviated from the correct position relative to erasing core chip 7. Thus the erasing gaps 2a become unequal, the gap accuracy, the off-erasing accuracy and the yield of magnetic heads are reduced.

SUMMARY OF THE INVENTION

In order to solve the above problem, according to the present invention, when the erasing core chip is manufactured, the coupling body coupling the erasing cores is prevented from being eroded by the low-melting point glass by constituting all of the coupling body, or the periphery of the narrower groove portion receiving the recording and reproducing core, using a nonmagnetic material such as ceramic, nonmagnetic ferrite, nonmagnetic metal or an inorganic bond.

Thus when the erasing core chip is joined at its connection portion to the recording and reproducing core, it is prevented from being eroded by the low-melting point glass binder and the accuracy with which the groove is cut is improved.

DETAILED DESCRIPTION OF THE PREFERRED EMBODIMENTS

One embodiment of the present invention will now be described with respect to the drawings.

Figure 1A:
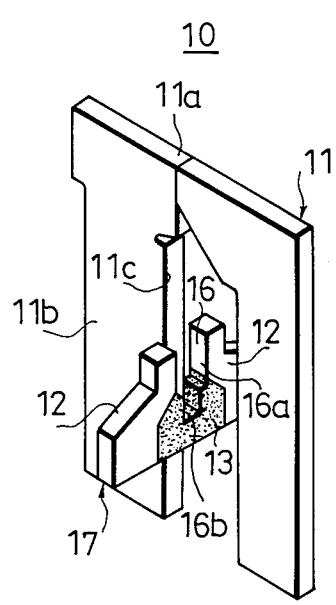
FIGS. 1(a) and (b) are perspective views showing the assembly of a magnetic head according to the present invention.
Figure 1B:
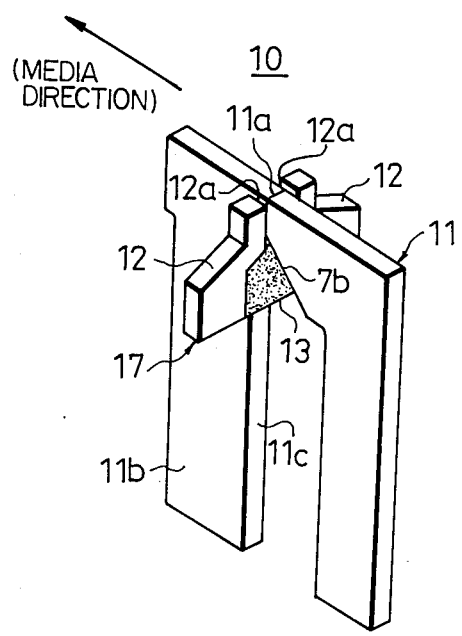

FIGS. 1(a) and (b) are perspective views showing the assembling of a magnetic head 10 according to the present invention. In FIGS. 1(a) and (b), recording and reproducing core 11 defines a recording and reproducing gap 11a at a predetermined position relative to a side edge 11c of one leg 11b of core 11. Core 11 is inserted into a groove 16 including a wide portion 16a and a narrower portion 16b formed in a coupling body 13 of a nonmagnetic material, such as ceramic, nonmagnetic ferrite or nonmagnetic metal, which couples a pair of erasing core pieces 12 into erasing core chip 17. Thus it is fitted into the narrower groove portion 16b and secured firmly to the groove by the low-melting point glass bond. This results in a magnetic head 10 having an erasing gap 12a on each side of recording and reproducing gap 11a.

The process of manufacturing the erasing core chip 17 included in the magnetic head 10 according to the present invention will be described below.

Figure 2A:
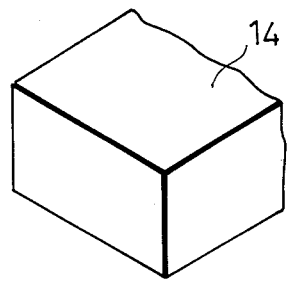
FIGS. 2(a)-(f) are perspective views of a process illustrating the steps of manufacturing an embodiment of the present invention.
Figure 2D:
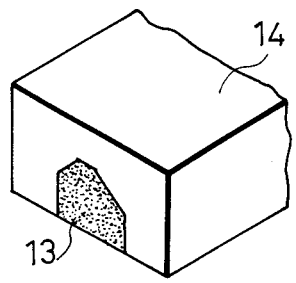
Figure 2B:
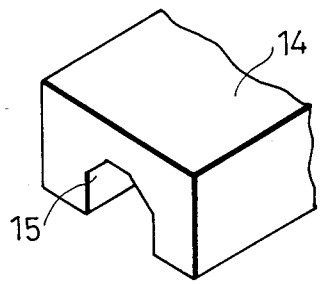
Figure 2E:
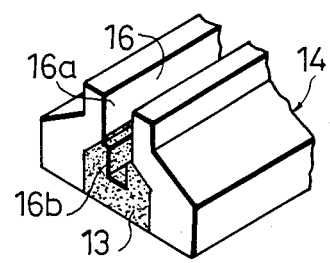
Figure 2C:
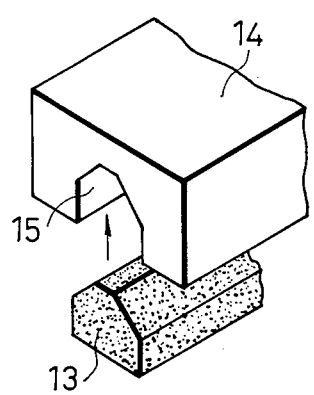
Figure 2F:
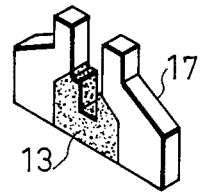

FIGS. 2(a)-(f) are perspective views of a process of one embodiment showing the steps of manufacturing the core chip. FIG. 2(a) denotes a fragmentary rectangular parallele-piped block 14 of ferrite, sendust or the like for the core material. First, as shown in FIG. 2(b), a recess of a desired shape 15 is cut in a lower surface of the block as seen in FIG. 2(b). Next, as shown in FIG. 2(c), coupling body 13 of a nonmagnetic material such as ceramic, nonmagnetic ferrite, nonmagnetic metal or the like and having a shape complementary to that of the recess 15 is fitted into the groove. As shown in FIG. 2(d), coupling block 13 is then joined to recess 15 in block 14 with glass having a higher melting point than the low-melting point glass.

As shown in FIG. 2(e), a groove 16 is provided extending from the middle top of block 14 into coupling block 13. Block 14 is cut away on each side of wide groove portion 16a so as to obtain a core block having a desired shape. Finally, the core block 14, thus obtained, is sliced into erasing core chip 17 having a predetermined thickness and including two cores 12 and coupling body 13 coupling the cores integrally.

Figure 3A:
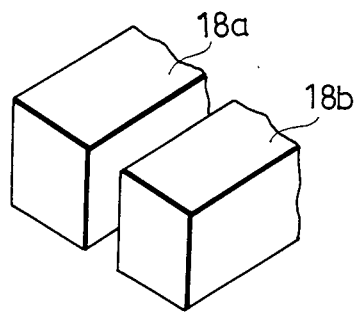
FIGS. 3(a)-(e) are perspective views of a process showing the steps of manufacturing another embodiment.
Figure 3D:
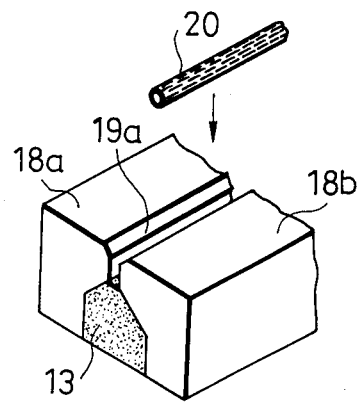
Figure 3B:
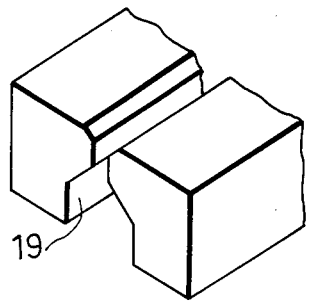
Figure 3E:
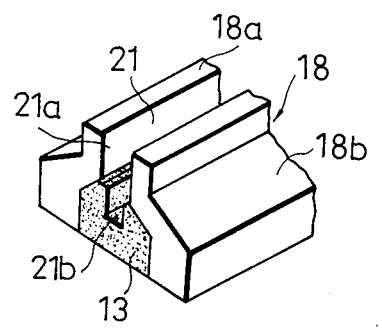
Figure 3C:
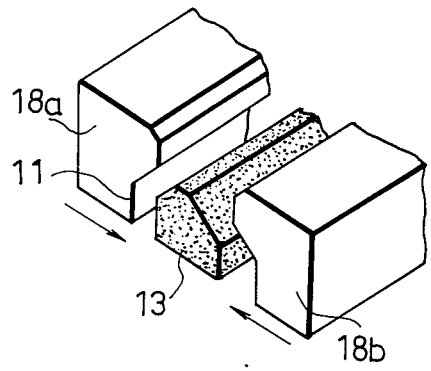

FIGS. 3(a)-(e) are fragmentary perspective views of semiproducts of another embodiment of the present invention. FIG. 3(a) shows a pair of rectangular parallelepiped blocks 18a and 18b for the core material. As shown in FIG. 3(b), the blocks 18a and 18b are cut away at their adjacent lower portions so as to form recesses 19. As shown in FIG. 3(c), the blocks 18a and 18b are held coupled together by a coupling block, also serving as a spacer, of a nonmagnetic metal such as ceramics, nonmagnetic ferrite or nonmagnetic metal 13. As shown in FIG. 3(d), a high-melting point glass rod 20 is disposed in a groove 19a formed between the upper portions of the two blocks 18a and 18b of the semi-product obtained in the step of FIG. 3(c) and melted in an oven to fuse the core-like binder block 13 to core blocks 18a and 18b.

As shown in FIG. 3(e), groove 21 including wide portion 21a and narrower portion 21b is then formed in the semiproduct obtained in the step of FIG. 3(d), as in the previous embodiment. Each core block is then cut away on each side of groove 21 so as to have the form of an erasing core block 18. Finally, the erasing core block 18 is sliced into an erasing core chip having a predetermined thickness.

Figure 4:
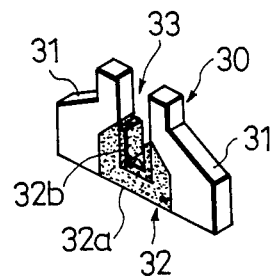
FIG. 4 is a perspective view showing a further embodiment.
Figure 5:
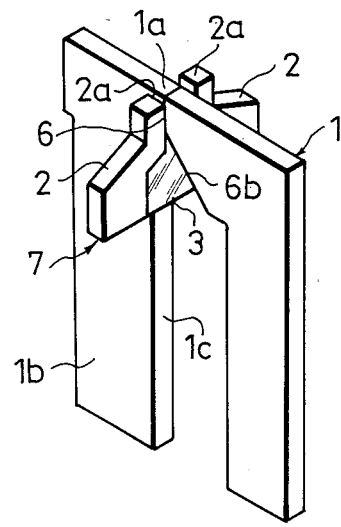
FIG. 5 is a perspective view showing a conventional example.
Figure 6A:
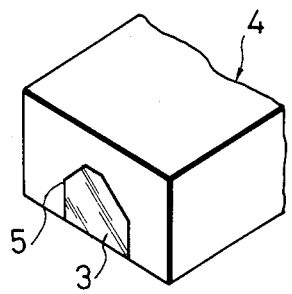
FIGS. 6(a)-(c) are perspective views showing the steps of manufacturing the conventional example.
Figure 6B:
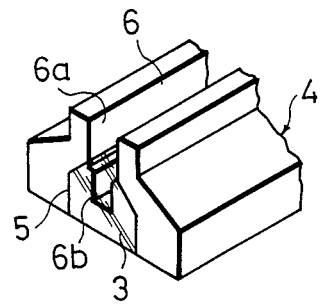
Figure 6C:
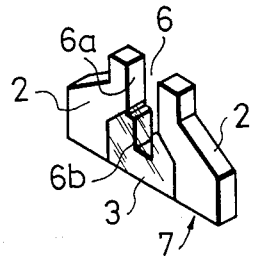

FIG. 4 is a perspective view of a further embodiment. When erasing core chip 30 having a groove 33 including a wide portion 33a and a narrower portion 33b is manufactured, the periphery of narrower groove portion 33b of groove 33 is covered with a layer of ceramic, nonmagnetic ferrite, non-magnetic metal or an inorganic bond, which glass can hardly or never erode. The core pieces 31 are joined together by high-melting point glass 32a to form erasing core chip 30.

As described above, in the magnetic head according to the present invention, that portion of the erasing core chip into which the recording and reproducing core is fitted is made of a nonmagnetic material, such as ceramic, nonmagnetic ferrite or nonmagnetic metal, or an inorganic bond, which glass can hardly or never erode. Therefore, the inner wall of the groove in the erasing core chip is not eroded by glass when the erasing core chip is joined to the recording and reproducing core. This improves the accuracy of assembly, so that the two erasing gaps are correctly positioned with predetermined gap widths, thereby improving the yield. In addition, when ceramics which is good to cut compared with glass is used, the accuracy of cutting a groove, the service life of a grinding stone used, and the accuracy of slicing the chip are improved compared with the prior art. The occurrence of defects such as breakages are reduced.

What is claimed is:

1. In a straddle type magnetic head of the type having a pair of erasing cores made of a magnetic material each having a respective core piece extending in a vertical direction in parallel with each other to a medium contacting side of said magnetic head, wherein the core pieces are spaced apart by a first width in a first horizontal direction from each other, a coupling body provided between said pair of erasing cores for coupling the pair of erasing cores together, said coupling body having a groove formed therein on a side facing the medium contacting side which has a second width in the first horizontal direction narrower than said first width, and a recording/reproducing core extending in a second horizontal direction perpendicular to said first horizontal direction provided with a portion having a recording/reproducing gap which is fitted into said groove of said second width and bonded therein using a low melting temperature, glass material, wherein said magnetic head is assembled with said erasing core pieces spaced on each side of said recording/reproducing gap so as to form a respective erasing gap on each side thereof by said first width being larger than said second width, the improvement wherein at least a peripheral portion of said coupling body which forms said groove is made of a nonmagnetic material which is not a glass material and which is not dimensionally eroded at the low melting temperature of said glass material bonding said recording/reproducing core in said groove of said coupling body for said pair of erasing cores, whereby when said recording/reproducing core is fitted and bonded with said glass material into said groove, the spacing of said erasing core pieces on each side thereof is not dimensionally eroded.

2. A head according to claim 1, wherein said nonmagnetic material is selected from the group consisting of ceramic, nonmagnetic ferrite and nonmagnetic metal.

3. A head according to claim 1, wherein at least the periphery of said groove is formed by a layer of a material selected from the group consisting of ceramic, nonmagnetic ferrite or nonmagnetic metal, or an inorganic bond and wherein said coupling body except for the neighborhood of said groove is made of high-melting point glass.

* * * * *

UNITED STATES PATENT AND TRADEMARK OFFICE
CERTIFICATE OF CORRECTION

PATENT NO. : 4,769,728

DATED : September 6, 1988

INVENTOR(S) : Humitoshi Toyoshima and Shoichi Koyama

It is certified that error appears in the above-identified patent and that said Letters Patent is hereby corrected as shown below:

The Title should read --STRADDLE TYPE MAGNETIC HEAD HAVING CERAMIC COUPLING BODY--

Signed and Sealed this

Twenty-first Day of March, 1989

Attest:

DONALD J. QUIGG

Attesting Officer      Commissioner of Patents and Trademarks